(12) United States Patent
Allan

(10) Patent No.: US 9,369,549 B2
(45) Date of Patent: *Jun. 14, 2016

(54) 802.1AQ SUPPORT OVER IETF EVPN

(71) Applicant: Telefonaktiebolaget L M Ericsson (publ), Stockholm (SE)

(72) Inventor: David Ian Allan, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/800,279

(22) Filed: Jul. 15, 2015

(65) Prior Publication Data

US 2015/0319007 A1 Nov. 5, 2015

Related U.S. Application Data

(63) Continuation of application No. 14/493,150, filed on Sep. 22, 2014, now Pat. No. 9,112,848, which is a continuation of application No. 13/594,076, filed on Aug. 24, 2012, now Pat. No. 8,867,367.

(60) Provisional application No. 61/645,431, filed on May 10, 2012.

(51) Int. Cl.
*H04L 12/28* (2006.01)
*H04L 29/06* (2006.01)
*H04L 12/66* (2006.01)
(Continued)

(52) U.S. Cl.
CPC .............. *H04L 69/08* (2013.01); *H04L 12/462* (2013.01); *H04L 12/4658* (2013.01); *H04L 12/4662* (2013.01); *H04L 12/66* (2013.01); *H04L 45/50* (2013.01); *H04L 45/66* (2013.01); *H04L 49/351* (2013.01); *H04L 69/18* (2013.01); *H04L 12/4641* (2013.01)

(58) Field of Classification Search
CPC ... H04L 45/00; H04L 45/026; H04L 12/4625; H04L 12/28; H04L 29/14
See application file for complete search history.

(56) References Cited

U.S. PATENT DOCUMENTS

| 8,005,081 B2 | 8/2011 | Bragg et al. |
| 8,223,668 B2 | 7/2012 | Allan et al. |

(Continued)

OTHER PUBLICATIONS

IEEE Std 802.1aq-2012: "IEEE Standard for Local and Metropolitan Area Networks—Media Access Control (MAC) Bridges and Virtual Bridged Local Area Networks—Amendment 20: Shortest Path Bridging," IEEE Computer Society, Jun. 29, 2012, 340 pages.

(Continued)

*Primary Examiner* — Andrew Lee
(74) *Attorney, Agent, or Firm* — Nicholson, De Vos, Webster & Elliot, LLP

(57) ABSTRACT

A method is implemented in a provider edge switch (PE) for interworking an 802.1aq control plane with an Ethernet Virtual Private Network (EVPN) Border Gateway Protocol (BGP) control plane. The method includes receiving an Intermediate System-Intermediate System (IS-IS) protocol data unit (PDU) including an IS-IS Type Length Value (TLV) by the PE and determining whether the received IS-IS PDU requires a change in a configuration of designated forwarder (DF). The method further includes determining whether the PE is still the DF for one or more Backbone-Virtual Local Area Network Identifiers (B-VIDs), and removing local DF associated network layer reachability information (NLRI) from a BGP database.

15 Claims, 6 Drawing Sheets

(51) Int. Cl.
*H04L 12/721* (2013.01)
*H04L 12/723* (2013.01)
*H04L 12/931* (2013.01)
*H04L 12/46* (2006.01)

(56) References Cited

U.S. PATENT DOCUMENTS

| | | | |
|---|---|---|---|
| 8,811,388 | B2 | 8/2014 | Fedyk |
| 2007/0171851 | A1* | 7/2007 | Beckmann .............. H04W 8/08 370/328 |
| 2008/0144644 | A1 | 6/2008 | Allan et al. |
| 2009/0310538 | A1* | 12/2009 | Lee ....................... H04L 1/0079 370/328 |
| 2010/0020797 | A1 | 1/2010 | Casey et al. |
| 2010/0281106 | A1 | 11/2010 | Ashwood-Smith |
| 2010/0316056 | A1* | 12/2010 | Unbehagen ........ H04L 12/4625 370/401 |
| 2011/0170403 | A1* | 7/2011 | Ashwood-Smith ..... H04L 45/66 370/216 |
| 2011/0228780 | A1 | 9/2011 | Ashwood-Smith et al. |
| 2011/0273980 | A1* | 11/2011 | Ashwood Smith ..... H04L 45/00 370/225 |
| 2012/0063451 | A1 | 3/2012 | Keesara et al. |
| 2012/0106347 | A1* | 5/2012 | Allan .................. H04L 12/4625 370/238 |
| 2012/0177041 | A1* | 7/2012 | Berman .............. H04L 12/4625 370/392 |
| 2012/0177042 | A1* | 7/2012 | Berman .............. H04L 12/4625 370/392 |
| 2012/0177043 | A1* | 7/2012 | Berman .............. H04L 12/4625 370/392 |
| 2012/0201539 | A1 | 8/2012 | Boerrtjes et al. |
| 2012/0233350 | A1 | 9/2012 | Unbehagen et al. |
| 2013/0114595 | A1 | 5/2013 | Mack-Crane et al. |
| 2013/0142511 | A1 | 6/2013 | Spraggs et al. |
| 2013/0195111 | A1 | 8/2013 | Allan et al. |
| 2013/0259046 | A1 | 10/2013 | Ramesh |
| 2014/0064063 | A1* | 3/2014 | Holness ................. H04L 29/14 370/225 |
| 2014/0086097 | A1* | 3/2014 | Qu ........................ H04L 45/026 370/254 |
| 2014/0092898 | A1 | 4/2014 | Berman |
| 2014/0112188 | A1 | 4/2014 | Keesara et al. |
| 2014/0126422 | A1 | 5/2014 | Bragg |

OTHER PUBLICATIONS

IEEE std 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.
RFC 3031: Rosen, et al., "Multiprotocol Label Switching Architecture," The Internet Society, Network Working Group, Request for Comments: 3031, Jan. 2001, 61 pages.
RFC 3353: Ooms, et al., "Overview of IP Multicast in a Multi-Protocol Label Switching (MPLS) Environment," The Internet Society, Network Working Group, Request for Comments: 3353, Aug. 2002, 30 pages.
RFC 3813: Srinivasan, et al., "Multiprotocol Label Switching (MPLS) Label Switching Router (LSR) Management Information Base (MIB)," The Internet Society, Network Working Group, Request for Comments: 3813, Jun. 2004, 60 pages.
RFC 5015: Handley, et al., "Bidirectional Protocol Independent Multicast (BIDIR-PIM)," Network Working Group, Request for Comments: 5015, Oct. 2007, 43 pages.
RFC 5036: Andersson, et al., "LDP Specification," Network Working Group, Request for Comments: 5036, Oct. 2007, 135 pages.
RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.
RFC 6514: Aggarwal, et al., "BGP Encodings and Procedures for Multicast in MPLS/BGP IP VPNs," Internet Engineering Task Force (IETF), Request for Comments: 6514, IETF Trust, Feb. 2012, 59 pages.
RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.
RFC 7734: Allan, et al., "Support for Shortest Path Bridging MAC Mode over Ethernet VPN (EVPN)," Internet Engineering Task Force (IETF), Request for Comments: 7734, IETF Trust, Jan. 2016, 11 pages.
Allan, et al., "Shortest Path Bridging, MAC Mode Support over EVPN, draft-ietf-bess-spbm-evpn-02," Internet Engineering Task Force (IETF), BESS Working Group, Internet-Draft, Oct. 2015, 11 pages.
Dalal, et al., "Reverse Path Forwarding of Broadcast Packets," Communications of the ACM, Dec. 1978, vol. 21, No. 12, pp. 1040-1048.
Farkas, et al., "IS-IS Path Computation and Reservation, draft-ietf-isis-pcr-02," Internet Engineering Task Force (IETF), IS-IS for IP Internets, Internet-Draft, Sep. 18, 2015, 32 pages.
Filsfils, et al., "Segment Routing with MPLS data plane, draft-ietf-spring-segment-routing-mpls-01," Network Working Group, Internet-Draft, May 29, 2015, 14 pages.
Filsfils, et al., "Segment Routing with MPLS data plane, draft-ietf-spring-segment-routing-mpls-02," Network Working Group, Internet-Draft, Oct. 17, 2015, 14 pages.
Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.
Kini, et al., "Entropy labels for source routed stacked tunnels, draft-ietf-mpls-spring-entropy-label-00," Internet Engineering Task Force (IETF), Network Working Group, Internet-Draft, Mar. 5, 2015, 12 pages.
IEEE P802.1aq/D4.6, Draft Standard for Local and Metropolitan Area Networks: "Media Access Control (MAC) Bridges and Virtual Bridged Local Area Networks—Amendment XX: Shortest Path Bridging," Feb. 10, 2012, the whole document.
Aggarwal, et al., "BGP MPLS Based Ethernet VPN, draft-ietf-l2vpn-evpn-00," IETF Network Working Group Internet Draft, Feb. 24, 2012, 39 pages.
Fedyk, et al., "IS-IS Extensions Supporting IEEE 802.1aq Shortest Path Bridging," RFC6329, Apr. 2012, the whole document.
Rosen, et al., "BGP/MPLS IP Virtual Private Networks (VPNs)," RFC4364, Feb. 2006, the whole document.
Sajassi, et.al., "PBB E-VPN, draft-ietf-l2vpn-pbb-evpn-02," IETF Trust, Internet Working Group, Internet Draft, Mar. 29, 2012, 27 pages.

\* cited by examiner

US 9,369,549 B2

802.1AQ SUPPORT OVER IETF EVPN

CROSS REFERENCE TO RELATED APPLICATIONS

The present application is a continuation of U.S. patent application Ser. No. 14/493,150 filed Sep. 22, 2014, which is a continuation of U.S. patent application Ser. No. 13/594,076 filed Aug. 24, 2012, which claims priority from U.S. Provisional Patent Application No. 61/645,431 filed on May 10, 2012.

FIELD OF THE INVENTION

Embodiments of the invention relate to the field of computer networking. Specifically, the embodiments relate to interworking of 802.1aq SPBM with IETF EVPN.

BACKGROUND

The IEEE 802.1aq standard (also referred to 802.1aq hereinafter), was published in 2012 and defines a routing solution for Ethernet that replaces prior routing solutions including Spanning Tree Protocols. 802.1aq is also known as Shortest Path Bridging or SPB. 802.1aq enables the creation of logical Ethernet networks on native Ethernet infrastructures. 802.1aq employs a link state protocol (i.e., Intermediate System to Intermediate System (IS-IS)) to advertise network topology and logical network membership of the nodes in the network. The link state information is used to calculate shortest path trees from all bridges in the SPB region. The computations are done in an independent and distributed manner with each node generating its own forwarding tables to implement its part in SPB region wide forwarding.

Data are encapsulated at the edge nodes of the networks implementing 802.1aq. This encapsulation can be in 802.1ah or tagged 802.1Q/p802.1ad frames. These frames are transported only to other members of the respective logical network. Unicast and multicast are also supported by 802.1aq. All such routing is done via symmetric shortest paths. Multiple equal cost shortest paths are supported. Implementation of 802.1aq in a network simplifies the creation and configuration of the various types of networks including provider networks, enterprise networks and cloud networks. The configuration is comparatively simplified and diminishes the likelihood of error, specifically human configuration errors in comparison with prior routing solutions. 802.1aq also increases bandwidth and reliability by improved use of the network mesh topology. By enabling all paths greater utilization can be obtained through the use of multiple equal cost paths. Improved convergence times and larger topologies can also be supported.

EVPN is a new approach to doing L2VPNs over MPLS using the BGP protocol. It offers a number of improvements over previous L2 VPN technologies, a principal one being the use of the BGP control plane for mirroring the Ethernet FDBs across the set of supporting MPLS PEs.

SUMMARY

A method is implemented in a provider edge switch (PE) for interworking an 802.1aq control plane with an Ethernet Virtual Private Network (EVPN) Border Gateway Protocol (BGP) control plane. The method includes receiving an Intermediate System-Intermediate System (IS-IS) protocol data unit (PDU) including an IS-IS Type Length Value (TLV) by the PE and determining whether the received IS-IS PDU requires a change in a configuration of designated forwarder (DF). The method further includes determining whether the PE is still the DF for one or more Backbone-Virtual Local Area Network Identifiers (B-VIDs), and removing local DF associated network layer reachability information (NLRI) from a BGP database and remote NLRI from an IS-IS database, in response to the PE no longer being the DF.

A computing device executes a process to implement a provider edge switch (PE) for interworking an 802.1aq control plane with an Ethernet Virtual Private Network (EVPN) Border Gateway Protocol (BGP) control plane. The computing device includes a processor configured to execute the PE. The PE includes a control plane interworking function, an Intermediate System-Intermediate System (IS-IS) module and a BGP module. the control plane interworking function is configured to determine whether a received IS-IS protocol data unit (PDU) including an IS-IS Type Length Value (TLV) requires a change in a configuration of a DF, to determine whether the PE is still the DF for one or more Backbone-Virtual Local Area Network Identifiers (B-VIDs), and to remove local DF associated network layer reachability information (NLRI) from a BGP database and remote NLRI from an IS-IS database, in response to the PE no longer being the DF.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
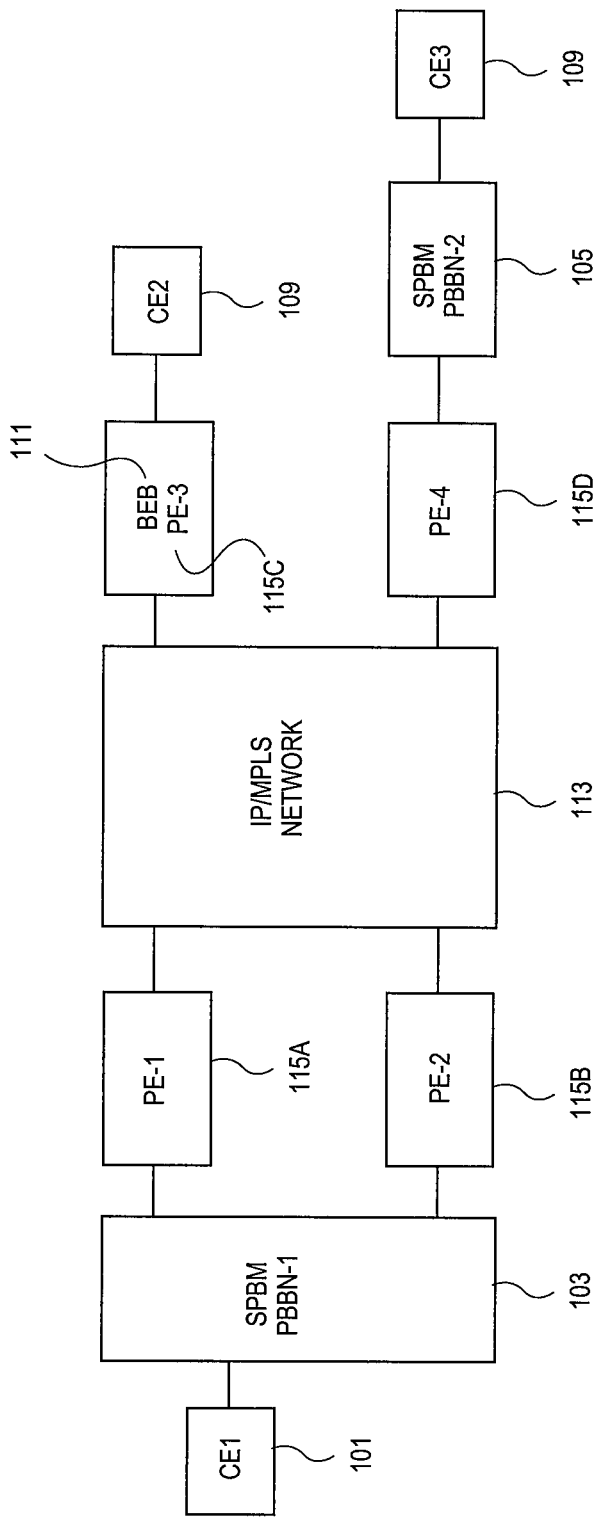
FIG. 1 is a diagram of one embodiment of an example PBB and SPBM-PBBN EVPN network implementing 802.1aq support over EVPN.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary structural embodiments illustrated in the Figures. However, it should be understood that the operations of the flow diagrams can be performed by structural embodiments of the invention other than those discussed with reference to Figures, and the embodiments discussed with reference to Figures can perform operations different than those discussed with reference to the flow diagrams.

The techniques shown in the figures can be implemented using code and data stored and executed on one or more electronic devices (e.g., an end station, a network element, or similar device). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The following Acronyms are used herein and provided for reference: BCB—Backbone Core Bridge; BEB—Backbone Edge Bridge; BGP—Border Gateway Protocol; BU—Broadcast/Unknown; CE—Customer Edge; C-MAC—Customer/Client MAC Address; CP—Control Plane; DF—Designated Forwarder; ECT—Equal Cost Tree; ESI—Ethernet Segment Identifier; EVI—E-VPN Instance; EVN—EVPN Virtual Node; EVPN—Ethernet VPN; I-SID—I Component Service ID; IS-IS—Intermediate Service-Intermediate Service; ISIS-SPB—IS-IS as extended for SPB; LAG—Link Aggregation Group; MAC—Media Access Control; PE—MPLS Edge Switch; MPLS—Multi-Protocol Label Switching; MP2MP—Multipoint to Multipoint; MVPN: Multicast VPN; NLRI—Network Layer Reachability Information; OUI—Organizationally Unique ID; PBB—Provider Backbone Bridge; PBB-PE—Co located BEB and PE; PBBN—Provider Backbone Bridged Network; P2MP—Point to Multipoint; P2P—Point to Point; RD—Route Distinguisher; RPFC—Reverse Path Forwarding Check; RT—Route Target; SPB—Shortest Path Bridging; SPBM—Shortest Path Bridging MAC Mode; TLV—Type Length Value; VID—VLAN ID; VLAN—Virtual Local Area Network; and VPN—Virtual Private Network.

The embodiments of the present invention provide a method and system for avoiding the disadvantages of the prior art. The disadvantages include that the provider backbone bridging Ethernet virtual private network (PBB EVPN) approach does not consider the possibility or implications of a provider backbone bridging network (PBBN), nor under normal circumstances does the prior art guarantee symmetry and congruency across the core network, which is a key requirement for multiply attached PBBNs. As such the necessary procedures and requirements for implementing PBB EVPN have not been previously been properly or thoroughly defined.

The embodiments of the present invention overcome the disadvantages of the prior art. The embodiments of the invention provide that a backbone edge bridge (BEB) encodes a backbone media access control (B-MAC) address and service instance identifier (I-SID) in the MAC advertisement route of the network layer reachability information (NLRI) information. Further, the multi-protocol label switching (MPLS) label offered in this NLRI is common to all BEB/I-SID NLRIs sharing a common backbone virtual local area network identifier (B-VID) in the subtending PBBN. This provides a mechanism to infer B-VID locally, and reconstruct multipath symmetric congruence for traffic upon transit from the EVPN to the subtending PBBN. This also allows decoupling of multipath design between different EVPN interconnected SPBM-PBBNs.

IEEE 802.1aq Overview

In IEEE 802.1aq networks, a link state protocol is utilized for controlling the forwarding of Ethernet frames on the network. One link state protocol, the Intermediate System to Intermediate System (IS-IS), is used in 802.1aq networks for advertising both the topology of the network and logical network membership.

802.1aq has two modes of operation. A first mode for Virtual Local Area Network (VLAN) based networks is referred to as shortest path bridging VLANID (SPBV). A second mode for MAC based networks is referred to as shortest path bridging MAC (SPBM). Both SPBV and SPBM networks can support more than one set of equal cost forwarding trees (ECT sets) simultaneously in the data plane. An ECT set is commonly associated with a number of shortest path VLAN identifiers (SPVIDs) forming an SPVID set for SPBV, and associated 1:1 with a Backbone VLAN ID (B-VID) for SPBM.

According to 802.1aq MAC mode, network elements in the provider network are configured to perform multipath forwarding of data traffic separated by B-VIDs so that different frames addressed to the same destination address, but mapped to different B-VIDs can be forwarded over different paths (referred to as "multipath instances") through the network. A customer data frame associated with a service is encapsulated in accordance with 802.1aq with a header that has a separate service identifier (I-SID) and B-VID. This separation permits the services to scale independently of network topology. Thus, the B-VID can then be used exclusively as an identifier of a multipath instance. The I-SID identifies a specific service to be provided by the multipath instance identified by the B-VID. The actual routing of multipath instances in an 802.1aq network is determined by tie breaking based on each node's system IDs.

EVPN is an Ethernet over MPLS VPN protocol solution that uses BGP to disseminate VPN and MAC information and uses MPLS as the transport protocol. At least one embodiment seeks to interconnect subtending 802.1.aq networks (referred to as SPBM-PBBNs), while operationally decoupling the SPBM-PBBNs, by minimizing (via need to know filtering) the amount of state, topology information, nodal nicknames and B-MACS that are leaked from BGP into the respective subtending SPBM-PBBN IS-IS control planes. These embodiments also aim to decouple network design using a distinct number of multi-pathing instances in each subtending SPBM-PBBN. These embodiments also minimize the amount of configuration required. The embodiments provide a mechanism and procedures for properly resolving the presence of a B-MAC in more than one B-VID once B-VID context has been removed. The embodiments also enable BEB B-MACs to exist in multiple B-VIDs in MSTP controlled networks (802.1ah) as well as IS-IS (802.1aq) controlled Ethernet networks Prior EVPN implementations do not have a PBBN attached to any PE and there is no backbone Ethernet networking component. Thus, in these prior systems there are no B-VIDs and that function is null. There is no requirement for symmetric and congruent multicast trees and EVPN itself is not congruent across an MPLS network. Therefore, in previous networks the unit of configured load spreading is the I-SID. EVPN devotes a lot of energy to "active-active" multi-chassis uplinks (a.k.a., Multi-chassis Link Aggregation Group (MC-LAG)).

Prior designated forwarder (DF) approaches pin the I-SID to a specific PE. This requires all B-MACs that support that I-SID to transit to the specific PE. However, a B-MAC can be associated with other I-SIDs that have a different PE for transit to the core network, i.e., these I-SIDS are associated with a different DF. Therefore a B-MAC could appear as being associated with multiple PEs within the same B-VID. This created what is considered to be a duplicate MAC problem incompatible with the implementation of Ethernet switching hardware. This problem forces all I-SIDs that have a BEB in common to share a common DF, a requirement that is not sustainable across additions, moves and changes within the network and accordingly will eventually cause a failure in the network as it will ultimately be configured in a way incompatible with the capabilities of the data plane.

Explicitly pinning a DF for the I-SID/B-MAC tuple causes a large amount of configuration overhead. Rules would be required to pin all I-SIDs associated with a B-VID for the BEB at the same PE, which introduces significant operational complexity. Separating how B-MACs were represented from I-SID pinned DFs. EVPN was introduced for B-MACs only, but this produced non-congruent unicast/multicast trees, so SPBM RPFC would disrupt and fail for most multicast traffic. Computing the shortest path to an EVPN virtual node was introduced in order to select the PE that advertises I-SID/B-MAC tuples. However, the problem with this was a change in the shortest path in ISIS-SPB resulted in withdrawal and re-advertisement of a lot of information.

In the embodiments, an interworking between BGP and SPBM IS-IS is assumed. An EVPN PE can translate between BGP/MPLS on the EVPN side and standard 802.1aq on the PBBN side. In the embodiments, it is possible to make the PBB-EVPN model work with SPBM-EVPN. In such embodiments, co-located BEB/PE's can fully participate in a larger set of SPBM PBBNs. The embodiment offers a solution for mapping existing S-tagged PBNs into an EVPN instance. In one embodiment, the B-VID is pinned. The provisioning to pin individual I-SIDs would result in a huge amount of configuration, and it is possible to configure the DFs such that a B-MAC appears in multiple PEs in the same B-VID in the same PBBN, thus it would not work. Rather, the embodiments provide that a PE is elected a DF for a given B-VID in the PBBN. A given PE is designated the transit device for the set of I-SIDs associated with a given B-VID. The PE inherits the B-VID designation and advertises the PE as the DF for all I-SIDs advertised by the SPBM-PBBN for that B-VID in that segment (note that a given I-SID value only exists in a single B-VID at a given time in an SPBM-PBBN). The PE may use a common MPLS label for the B-VID for all I-SID advertisements (advertised in the "type +2" NLRI). Thus, this is advertised in a BGP NLRI information element specific to SPBM and PBB structured to contain: a route distinguisher of significance to BGP; an Ethernet segment identifier (unique identifier for the local SPBM-PBBN); an Ethernet tag ID that contains the I-SID and the Tx/Rx attributes that are the logical OR of all BEBs in the PBBN that have registered as interested in the I-SID; the B-MAC address of the BEB associated with the I-SID; and an MPLS label value to use when encapsulating frames to that PE.

In the embodiments, the PE logically appears as a BEB in the PBBN. If other EVPN connected segments have advertised an I-SID that corresponds to an I-SID registered in the local PBBN and the PE is the DF for the B-VID that I-SID is associated with, then the PE advertises remote I-SID interest into ISIS-SPB, if they have not, the PE is silent. This process keeps the global I-SID table out of the individual ISIS-SPB instances.

To enable this functionality a particular configuration is specified. The PE is configured as a BEB and has an ISIS system ID, as well as a nodal nickname (SP source ID) for multicast. DF election is described further herein below. DF election configuration can in another embodiment be by other means as long as election can be determined by a distributed means, be it algorithmic or pre-configured, the requirement being that each PE can independently and in isolation elect DFs and get the same answer as other nodes. Each PBBN is assigned a segment ID. The set of PBBNs in the larger multi-site VPN is assigned a route target (RT).

In the control plane interworking operation between ISIS-SPB and BGP, NLRI data elements are received by the PE from other BGP speakers. A PE has already determined whether it is a DF for a B-VID by the DF election procedures described herein below. A PE learns the local I-SID/B-VID bindings in the PBBN from IS-IS. A PE accepts the SPBM-PBB NLRI advertisements received from BGP. If the PE does not have local knowledge of the I-SID (no registered interest in the local PBBN) it simply retains the BGP information for future use. If the PE is a DF for the I-SID (that I-SID is associated with the B-VID the PE is a DF for) then the PE adds an entry to the EVPN mapping table, B_MAC/I_SID points to a label stack to use that contains the MPLS label from the SPBM-PBB NLRI advertisement and the Label for the FEC for the route destination (RD) advertised in the SPBM-PBB NLRI advertisements. The PE formulates an "SPBM service identifier and unicast address sub-TLV" containing the B-MAC, list of I-SIDs associated with the B-MAC in the BGP tables and the base VID (B-VID associated with the I-SID learned from ISIS-SPB) and adds this to the IS-IS database. This process can involve adding the I-SID to an existing IS-IS sub-TLV as a means of updating the IS-IS database.

In the control plane interworking operation for SPBM, a service identifier and unicast address sub-TLV are received by the PE from another IS-IS speaker in the PBBN. The PE checks if it is the DF for the B-VID in the sub-TLV. If the PE is a DF for a B-VID, the PE then formulates a BGP NLRI for each I-SID listed in the TLV not seen before where the RD contains the IP address of the PE, the Segment ID is the segment ID for the local PBBN, a Tag ID=I-SID and I-SID tx/rx attributes, and a MAC address is the B-MAC address from the sub-TLV. Note that the NLRI schema is based on an evolving standard, and it is possible to envision alternate NLRI encodings, such as one that advertises multiple I-SID registrations per B-VID, implying modification of existing BGP database records vs. the addition and removal of individual elements.

In data plane operation for the EVPN to PBBN interworking, all MPLS unicast packets arriving at the PE from the EVPN MPLS network have the B-VID to overwrite in the frame. This can be inferred from the MPLS label (if it is has been uniquely advertised for all I-SIDs in a single B-VID) or from the I-SID. All MPLS multicast packets arriving at the PE from the EVPN have the B-VID inferred from the I-SID as the label is source administered, not destination administered and therefore cannot be overloaded to infer B-VID as well. All packets with an Ethernet multicast destination address (DA) have the OUI portion of the DA-MAC overwritten with the local SPBM nodal nickname (SP Source ID) for the PE and the local address bit set if in an SPBM PBBN. If the PE is a PBB-PE, the standard OUI for 802.1ah I-SID multicast trees is included and the local address bit is clear.

In data plane operation for the PBBN to EVPN interworking, unicast frames arriving at a PE have the B-MAC/I-SID tuple looked up to determine the MPLS label stack to apply to the packet. Frames with multicast DAs have the B-VID looked up and are either locally replicated to each PE with registered interest in the I-SID, or mapped to a multicast group corresponding to the I-SID community of interest depending on what multicast capability is integrated into the EVPN implementation.

If there is a change of DF for a B-VID, the other PEs need to know when a DF for a B-VID has failed. This notification should be fast, but only in reaction to failure. This notice can be inferred by having a means of correlating the RDs for the segment ID advertised in BGP and the system IDs advertised in IS-IS. When a node that is a backup DF for a VID sees an RD associated with the segment ID & B-VID disappear from IS-IS and it has done loop avoidance handshaking with it's peers (common ISIS database digest), it knows the state has been ripped from the PBBN and it is safe to assume the role of DF for the VID. To avoid any duality or looping, the other DF is ensured to be offline. NLRIs are originated facing BGP sub-TLVs and originated for facing the PBBN.

The embodiments provide a solution for ensuring a B-MAC in a given B-VID only appears at one PE in a PBBN; this ensures that there is no forwarding ambiguity. The embodiments function such that a PE can steer traffic to an appropriate peer PE. The algorithmic pinning of a per B-VID DF as part of normal CP interworking operation minimizes the amount of potential configuration of PEs. The pinning of a per B-VID DF isolates the BGP EVPN from "churn" and routing instability in the individual PBBNs. The embodiments are compatible with existing PBB-EVPN model and no complex interworking is required. The embodiments can interwork with full loop avoidance.

FIG. 1 is a diagram of one embodiment of an example PBB and SPBM-PBBN EVPN network implementing 802.1aq support over EVPN. The network can include any number of customer edge equipment (CE) nodes 101 that are devices that connect a local area network (LAN) or similar set of customer devices with the SPBM-PBBN 103. The CE 101 can be any type of networking router, switch, bridge or similar device for interconnecting networks.

The SPBN-PBBN 103 is a set of network devices such as routers or switches forming a provider backbone network that implements shortest path bridging MAC mode. This network can be controlled by entities such as internet service providers and similar entities. The SPBM-PBBN can be connected to any number of other SPBN-PBBN 105, CE 109 (via a BEB 111) or similar networks or devices over an IP/MPLS 113 network or similar wide area network. These networks can interface through any number of PE 115A-D. The modification of the PE 115A-D to support 802.1aq over EVPN within the SPBM-PBBN are described further herein below. The illustrated network of FIG. 1 is simplified for sake of clarity. One skilled in the art would understand that the network can have any number of CE 101, 109, PBBN 103, 105 and PE 115A-D, where any given PBBN can connect with the IP/MPLS network 113 through any number of PE 115A-D.

The embodiments incorporate control plane interworking in the PE to map ISIS-SPB information elements into the EVPN NLRI information and vice versa. Associated with this are procedures for configuring the forwarding operations of the PE such that an arbitrary number of EVPN subtending SPB-PBBNs may be interconnected without any topological or multi-pathing dependencies. This model also permits PBB-PEs to seamlessly communicate with the SPB-PBBNs. The model can be extended to support the future 802.1Qbp standard permitting seamless interworking between 802.1ah, .1aq and .1Qbp as well as supporting subtending 802.1ad based PBNs.

A BGP route target (BGP identifier used to identify specific communities of interest in a BGP instance) identifies the set of SPB-PBBNs and BEB-PEs that are allowed to communicate. BGP acts as a common repository of the I-SID attachment points for the set of subtending PEs/PBBNs, that is to say the set of PBB-PEs and SPBM-PBBNs that are interconnected via EVPN. This is in the form of B-MAC address/I-SID/Tx-Rx-attribute tuples stored in the local BGP database of the PE. The CP interworking function filters the leaking of I-SID information in the BGP database into the local PBB-PE implementation or the local ISIS-SPB routing instance within each PBBN on the basis of locally registered interest. Leaking as used herein refers to the selective filtering of what BGP information is transferred to the local IS-IS database. If a PBBN has no BEBs registering interest in an I-SID, information about that I-SID from other PBBNs or PBB-PEs will not be leaked into the local ISIS-SPB routing system.

Each PBBN 103, 105 is administered to have an associated Ethernet Segment ID (ESI) associated with it. For each B-VID in an SPBM-PBBN 103, 105, a single PE 115A-D is elected the designated forwarder for the B-VID. A PE 115A-D may be a DF for more than one B-VID. This may be via configuration or via algorithmic means with algorithmic being the preferred embodiment. In some embodiments the network is configured to ensure a change in the designated forwarder is only required in cases of PE 115A-D failure or severing from either the PBBN 103, 105 or MPLS network 113 to minimize churn (i.e., the data load caused by BGP messaging and similar activity to reconfigured the network to utilize a different PE as the DF) in the BGP-EVPN.

Figure 2:
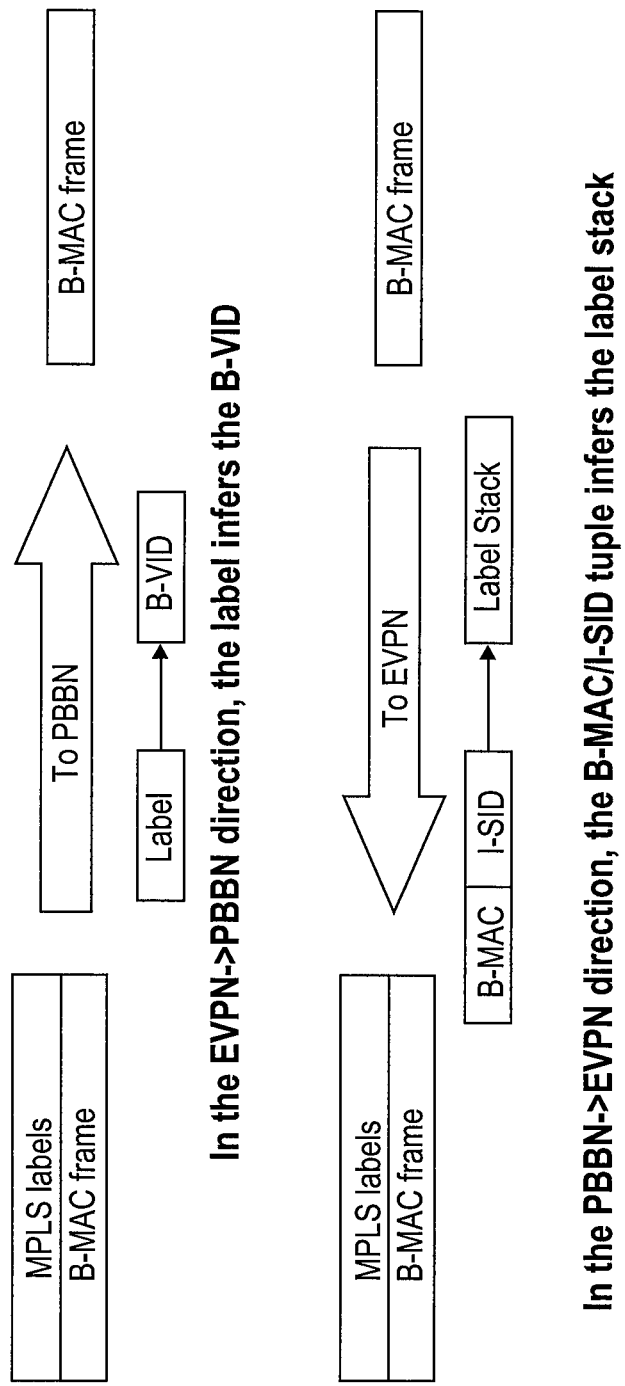
FIG. 2 is a diagram of one embodiment of the processing of frames as they are translated from PBBN to EVPN and from EVPN to PBBN.

FIG. 2 is a diagram of one embodiment of the processing of frames as they are interworked between a PBBN and an EVPN. When an SPBM frame arrives at a PE determined to be intended for a destination reachable by EVPN, the DA B-MAC and I-SID are looked up in the interworking table, and the MPLS label stack to prepend to the frame is determined, at which point we start to refer to the frame as a packet. This will typically be, but is not confined to be a VPN label and a PSN label. The packet is then forwarded accordingly. A packet arriving from EVPN will have the local B-VID inferred from either the MPLS label at the bottom of the label stack, or via I-SID lookup. The MPLS information is stripped from the front of the Ethernet frame, and B-VID field in the frame is updated. If the frame has a multicast DA B-MAC, then the OUI field is overwritten with the SP Source ID and local bits are updated according to local values prior to the frame being forwarded.

Control Plane Interworking EVPN to ISIS-SPB

When a PE receives a BGP NLRI that contains new information, it checks if the I-SID in the Ethernet Tag ID maps to the B-VID it is an elected DF for. If no BEBs in the SPB-PBBN have advertised any interest in the I-SID, it will not be associated with any B-VID locally, and therefore not of interest. If the I-SID is of local interest to the SPBM PBBN and the PE is the DF for that I-SID, a SPBM service identifier and unicast address sub-TLV is constructed/updated for advertisement into IS-IS and added to the local IS-IS database.

The NLRI information from BGP advertised into ISIS-SPB is also used to locally populate a forwarding table indexed by B-MAC/I-SID that points to the label stack to impose on the SPBM frame. The bottom label being that offered in the NLRI.

Data Plane Interworking SPBM-PBBN or PBB-PE to EVPN

When a PE receives a frame from the SPBM-PBBN in a B-VID for which it is a DF, it looks up the B-MAC/I-SID information to determine the label stack to be added to the frame for forwarding in the EVPN. The PE adds the label information to the frame and forwards the resulting MPLS packet.

Data Plane Interworking EVPN to SPBM-PBBN

When a PE receives a packet from the EVPN it may infer the B-VID to overwrite in the SPBM frame from the I-SID or by other means (such as via the bottom label in the MPLS stack). If the frame has a local multicast DA, it overwrites the nickname in the frame with the local nickname (SP Source ID).

Data Plane Interworking EVPN to PBB-PE

A PBB-PE actually has no subtending PBBN nor concept of B-VID so no frame processing is required. A PBB-PE is required to accept SPBM encoded multicast DAs as if they were 802.1ah encoded multicast DAs. The only information of interest being that it is a multicast frame, and the I-SID encoded in the lower 24 bits.

Figure 3:
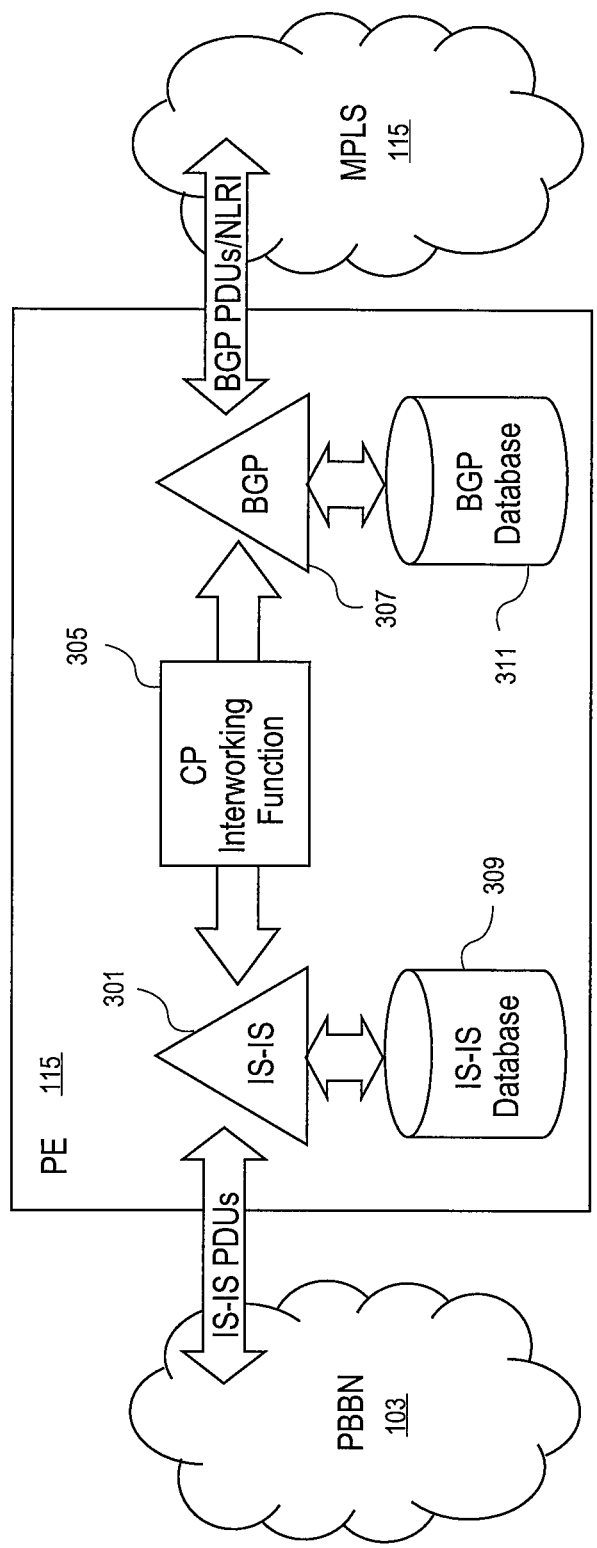
FIG. 3 is a diagram of one embodiment of a PE implementing the 802.1aq over EVPN.

FIG. 3 is a diagram of one embodiment of a PE implementing the 802.1aq over EVPN. The PE 115 is connected through one interface with the PBBN 103 and through a second interface with the IP/MPLS network 115. The PE includes an IS-IS module 301, a control plane (CP) interworking function 305, a BGP module 307, an IS-IS database 309 and a BGP database 311.

The IS-IS module 301 receives and transmits IS-IS protocol data units (PDUs) over the PBBN 103 to maintain topological and similar network information to enable forwarding of data packets over the PBBN 103. The BGP module 307 similarly receives and transmits BGP PDUs and/or NLRI over the IP/MPLS network interface to maintain topological and similar network information for the IP/MPLS network 115.

The CP interworking function exchanges 305 information between the IS-IS module 301 and BGP module 307 to enable the proper forwarding of data and enable the implementation of 802.1aq over EVPN. Control plane interworking for ISIS-SPB to EVPN is utilized when a PE receives an SPBM service identifier and unicast address sub-TLV as part of an ISIS-SPB MT capability TLV, it checks if it is the DF for the B-VID in the sub-TLV. If the PE is the DF and there is new or changed information, then a MAC advertisement route NLRI is created for each new I-SID in the sub-TLV. The Route Distinguisher (RD) is set to that of the PE. The ESI is set to that of the PBBN. The Ethernet tag ID contains the I-SID (including the Tx/Rx attributes). The encoding of I-SID information is as per TABLE I below.

TABLE I

| 0 | 1 | 2 | 3 |
|---|---|---|---|

0 1 2 3 4 5 6 7 8 9 0 1 2 3 4 5 6 7 8 9 0 1 2 3 4 5 6 7 8 9 0 1

+-+-+-+-+-+-+-+-+-+-+-+-+-+-+-+-+-+-+-+-+-+-+-+-+-+-+-+-+-+-+-+-+--

|T|R| Reserved |             I-SID                |

+-+-+-+-+-+-+-+-+-+-+-+-+-+-+-+-+-+-+-+-+-+-+-+-+-+-+-+-+-+-+-+-+--

The management of IS-IS TLVs and BGP NLRI is discussed further herein below in regard to FIGS. 4 and 5.

The PE configuration can occur at PBBN commissioning. A PE is configured with the route target for the service instance, whereby a service instance is defined as the set of PBBNs and PBB-PEs to be interconnected by the EVPN. The PE is also configured with a unique ESI for the SPBM-PBBN, a nodal nickname (SP Source ID) used for algorithmic construction of multicast DA addresses; the set of B-VIDs used in the PBBN and multi-pathing algorithm IDs to use, and the Route Distinguisher to use for the particular ESI. This is typically encoded as a type 1 as per RFC 4364.

The following is an exemplary DF election process that is implemented by each PE. In one embodiment, a PE self appoints in the role of DF for a B-VID for a given PBBN. The process is implemented where the PE notes the set of RDs associated with an ESI. For each B-VID in the PBBN, the PE XORs the associated ECT-Mask (see section 12 of RFC 6329) with the assigned number subfield of the set of RDs and ranks the set of PEs by the assigned number subfield. If the assigned number subfield for the local PE is the lowest value in the set, then the PE is the DF for that B-VID. Note that PEs need to re-evaluate the DF role anytime an RD is added or disappears from the ESI for the RT. In other embodiments, any DF election process can be utilized that is implemented via a configured table of possible scenarios or algorithm. The DF election process can ensure that all PEs attached to an ESI have some of the load divided between them and the distributed DF election process will produce the same result across the set of PEs implementing the DF election process for a given Ethernet segment.

Figure 4:
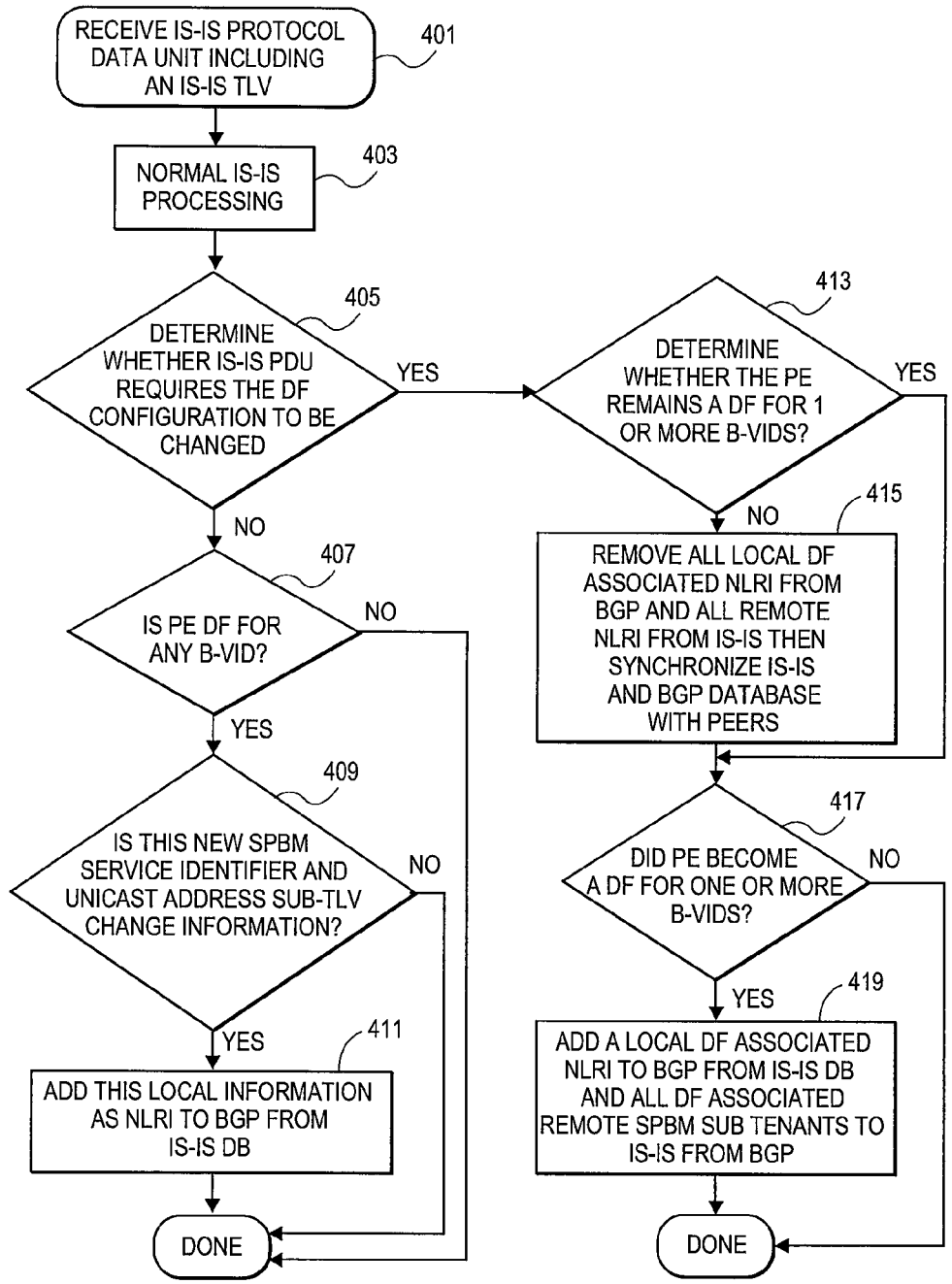
FIG. 4 is a flowchart of one embodiment of a process for handling an IS-IS TLV received by the PE. The process is initiated in response to receiving a IS-IS PDU such as a TLV.

FIG. 4 is a flowchart of one embodiment of a process of interworking the 802.1aq control plane with the EVPN BGP control plane whereby a technique for electing designated forwarders for a given B-VID in the local PBBN determines which PE uniquely transfers specific I-SID and MAC information for the B-VID from IS-IS into BGP and what (by direct inference from local I-SID to B-VID mappings) I-SID and MAC information in BGP is leaked from BGP into IS-IS as associated with the specific PE.

The method is initiated when an IS-IS PDU is received including an IS-IS TLV by the PE (Block 401). The received IS-IS PDU data is processed in the normal IS-IS protocol procedure (Block 403). A check is made whether the received IS-IS PDU data requires a change in the current configuration of designated forwarders (DFs) (Block 405) (e.g., there is a change in RD in the ESI for the RT). If a change is required, then a determination of whether the present PE is still a DF for one or more B-VIDs is made (Block 413). If a change is not required then a determination is made whether the current PE is a DF for any B-VID (Block 407).

In the event of a change and where the current PE is no longer a DF for at least one B-VIDs, then all local former DF associated network layer reachability information (NLRI) are removed from the BGP database and all remote NLRI sourced information for the DF is removed from the IS-IS database (Block 415). The IS-IS and BGP protocols then synchronize their databases with their respective peers. In the event of a change and where the current PE is not a DF or after all the NLRI is removed where the PE is a DF, a check is made whether the PE has become a DF for one or more B-VIDS (Block 407). If the PE has not become a DF, then the process is complete. If the PE has become a DF, then all local DF associated NLRI from the IS-IS database is added to the BGP database. Also all DF associated NLRI from with remote SPBM subtenants from BGP is added to the IS-IS database (Block 419).

Once DF status verification is complete, a check is made whether the current PE is a DF for any B-VID. If not, then the process ends. If the PE is a DF for at least one B-VID, then a check is made whether a received SPBM service identifier and unicast address sub-TLV associated with the B-VID has changed (Block 409). If not, then the process is complete. If this data has changed, then the local information is added to the NLRI in the BGP database from the IS-IS database (Block 411). The process then ends. The process can be reinitiated in response to the receipt of another IS-IS PDU or TLV.

Figure 5:
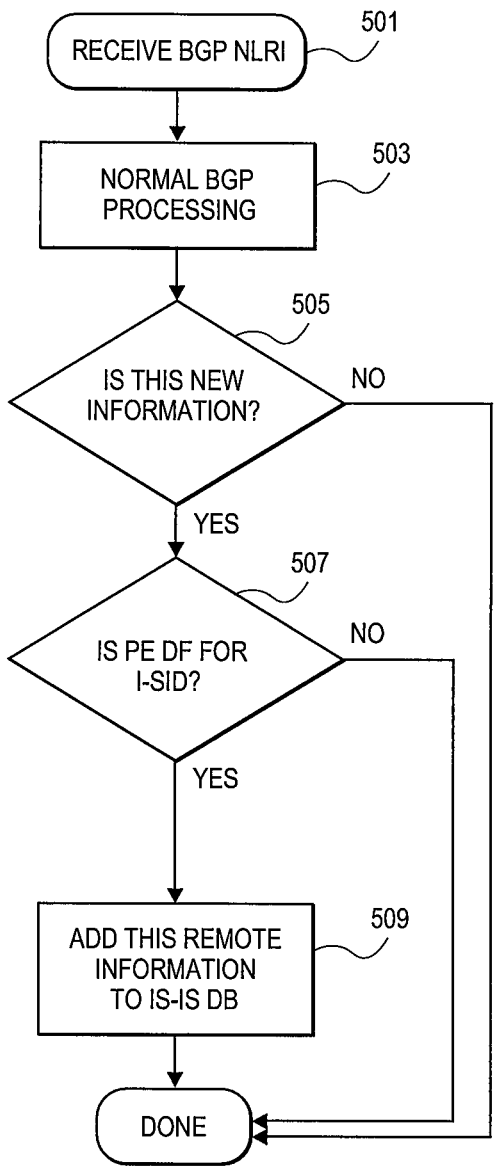
FIG. 5 is a flowchart of one embodiment of a process for BGP NLRI processing.

FIG. 5 is a flowchart of one embodiment of a process for BGP NLRI processing. In one embodiment, the process is initiated in response to receiving BGP NLRI (Block 501), which is processed according to the normal BGP protocol (Block 503). A check is made whether new information has been received with the NLRI (Block 505). If no new information has been received, then the process completes. If new information has been received, then a check is made whether the current PE is a DF for a specified I-SID. If the PE is not a DF for the I-SID (Block 507), then the remote information is added to the IS-IS database and the process completes (Block 509).

Similarly in the scenario where a PE became elected DF for a B-VID in an operating network, the IS-IS database would be processed in order to construct the NLRI information associated with the new role of the PE.

If the BGP database has NLRI information for the I-SID, and this is the first instance of registration of interest in the I-SID from the SPB-PBBN, the NLRI information with that tag is processed to construct an updated set of SPBM service identifier and unicast address sub-TLVs to be advertised by the PE.

The ISIS-SPB information is also used to keep current a local table indexed by I-SID to indicate the associated B-VID for processing of frames received from EVPN. When an I-SID is associated with more than one B-VID, only one entry is allowed in the table.

Flow Ordering

When per I-SID multicast is implemented via PE replication, a stable network will preserve frame ordering between known unicast and BU traffic (e.g. race conditions will not exist). This cannot be guaranteed when MVPN is utilized (distinct multicast trees that may not forward the same path as unicast traffic).

Transit

Any PE that does not need to participate in the tandem calculations can use the IS-IS overload bit to exclude SPBM tandem paths and behave as pure interworking platform.

Figure 6:
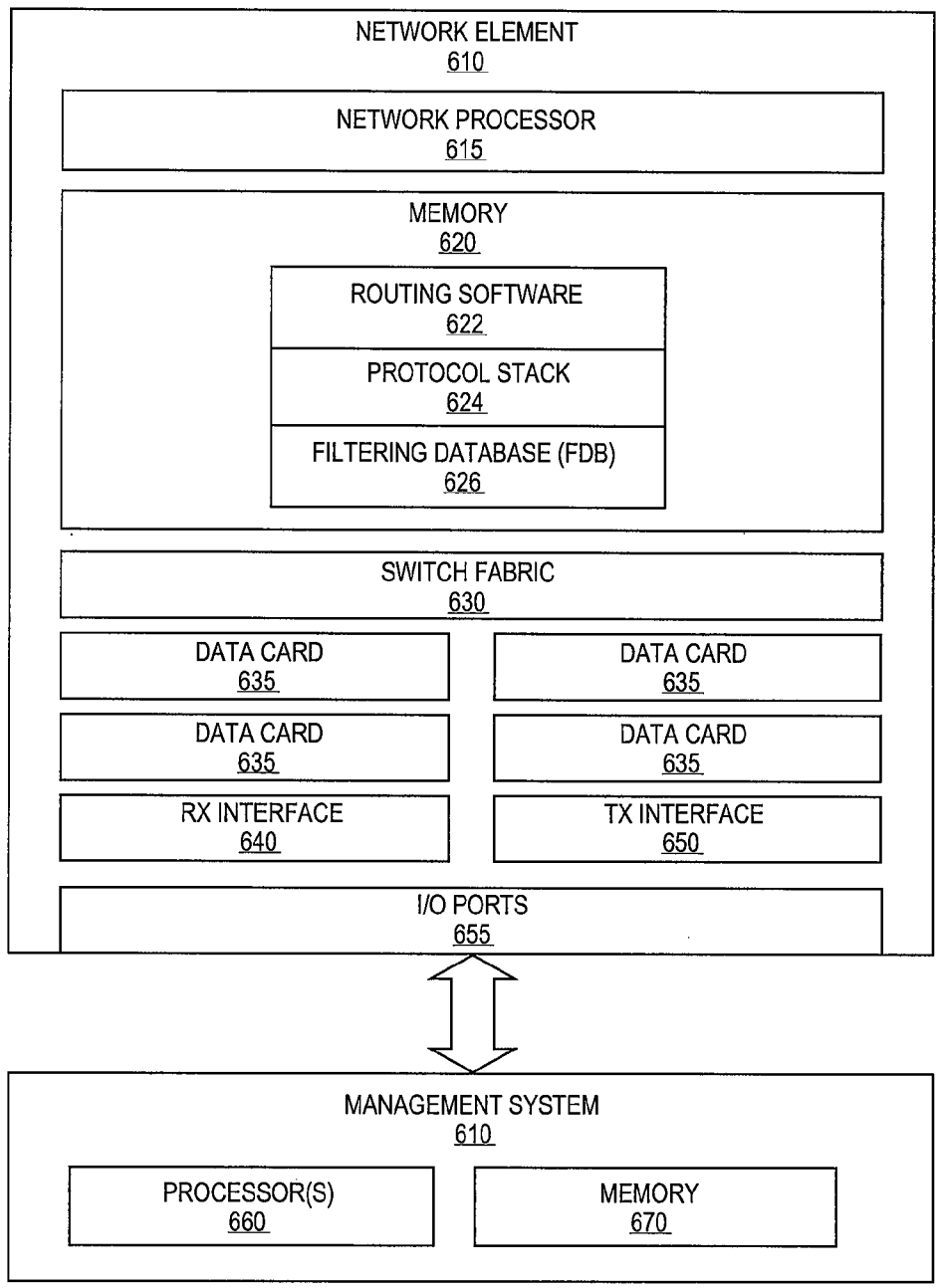
FIG. 6 illustrates an example a network element that may be used to implement an embodiment of the invention.

FIG. 6 illustrates an example a network element that may be used to implement an embodiment of the invention. The network element 610 may be any PE or similar device described above.

As shown in FIG. 6, the network element 610 includes a data plane including a switching fabric 630, a number of data cards 635, a receiver (Rx) interface 640, a transmitter (Tx) interface 650 and I/O ports 655. The Rx and Tx interfaces 640 and 650 interface with links within the network through the I/O ports 655. If the network element is an edge node, the I/O ports 655 also include a number of user-facing ports for providing communication from/to outside the network. The data cards 635 perform functions on data received over the interfaces 640 and 650, and the switching fabric 630 switches data between the data cards/I/O cards.

The network element 610 also includes a control plane, which includes one or more network processors 615 containing control logic configured to handle the routing, forwarding, and processing of the data traffic. The network processor 615 is also configured to perform split tiebreaker for spanning tree root selection, compute and install forwarding states for spanning trees, compute SPF trees upon occurrence of a link failure, populate a FDB 626 for data forwarding. Other processes may be implemented in the control logic as well.

The network element 610 also includes a memory 620, which stores the FDB 626 and a topology database 622. The topology database 622 stores a network model or similar representation of the network topology, including the link states of the network. The FDB 626 stores forwarding states of the network element 610 in one or more forwarding tables, which indicate where to forward traffic incoming to the network element 610.

In one embodiment, the network element 610 can be coupled to a management system 680. In one embodiment, the management system 680 includes one or more processors 660 coupled to a memory 670. The processors 660 include logic to configure the system IDs and operations of the network element 610, including update the system IDs to thereby shift work distribution in the network, assign priority to a subset of spanning trees such that non-blocking properties of the network are retained for at least these spanning trees. In one embodiment, the management system 680 may perform a system management function that computes forwarding tables for each node and then downloads the forwarding tables to the nodes. The system management function is optional (as indicated by the dotted lines); as in an alternative embodiment a distributed routing system may perform the computation where each node computes its forwarding tables.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a provider edge switch (PE) for interworking an 802.1aq control plane with an Ethernet Virtual Private Network (EVPN) Border Gateway Protocol (BGP) control plane, the method comprising the steps of:
   receiving an Intermediate System-Intermediate System (IS-IS) protocol data unit (PDU) including by the PE that changes configuration of the designated forwarder (DF);
   determining whether the PE is still a designated forwarder (DF) for one or more Backbone-Virtual Local Area Network Identifiers (B-VIDs); and
   removing local DF associated network layer reachability information (NLRI) from a BGP database and remote NLRI from an IS-IS database, in response to the PE no longer being the DF.

2. The method of claim 1, further comprising:
   synchronize the IS-IS database and BGP database with peer nodes, after removing the local DF associated NLRI from the BGP database and after removing information elements associated with a DF role obtained from remotely originated BGP NLRI from the IS-IS database.

3. The method of claim 1, further comprising the steps of:
   determining whether the PE is the DF for any B-VID;
   determining whether the IS-IS PDU contains new SPBM service identifier or unicast address sub-TLV change information; and
   adding the change information as NLRI to the BGP database from the IS-IS database.

4. The method of claim 3, further comprising:
   adding the DF associated network layer reachability information (NLRI) to the BGP database from the IS-IS database and local DF associated remote shortest path bridging media access control (MAC) mode (SPBM) sub tenants to the IS-IS database from the BGP database, in response to the PE becoming the DF for at least one B-VID.

5. The method of claim 1, further comprising the steps of:
   receiving BGP NLRI from a peer node;
   determining whether the BGP NLRI contains new information;
   determining whether the PE is the DF for an I-Component Source Identifier (I-SID) associated with the BGP NLRI; and
   adding remote information from the BGP NLRI to the IS-IS database.

6. A provider edge switch (PE) for interworking an 802.1aq control plane with an Ethernet Virtual Private Network (EVPN) Border Gateway Protocol (BGP) control plane, the PE comprising:
   a processor configured to execute a control plane interworking function, an Intermediate System-Intermediate System (IS-IS) module and a BGP module,
   the control plane interworking function configured to determine whether a received IS-IS protocol data unit (PDU) that requires a change in a configuration of a DF, to determine whether the PE is still the DF for one or more Backbone-Virtual Local Area Network Identifiers (B-VIDs), and to remove local DF associated network layer reachability information (NLRI) from a BGP database and remote NLRI from an IS-IS database, in response to the PE no longer being the DF.

7. The PE of claim 6, wherein the control plane interworking function is further configured to synchronize the IS-IS database and BGP database with peer nodes, after removing the local DF associated NLRI from the BGP database and after removing information elements associated with a DF role obtained from remotely originated BGP NLRI from the IS-IS database.

8. The PE of claim 6, wherein the control plane interworking function is further configured to determine whether the PE is the DF for any B-VID, to determine whether the IS-IS PDU contains new SPBM service identifier or unicast address sub-TLV change information, and to add the change information as NLRI to the BGP database from the IS-IS database.

9. The PE of claim 8, wherein the control plane interworking function is further configured to add the DF associated network layer reachability information (NLRI) to the BGP database from the IS-IS database and local DF associated remote shortest path bridging media access control (MAC) mode (SPBM) sub tenants to the IS-IS database from the BGP database, in response to the PE becoming the DF for at least one B-VID.

10. The PE of claim 6, wherein the BGP module is further configured to receive BGP NLRI from a peer node, and
    wherein the control plane interworking function is further configured to determine whether the BGP NLRI contains new information, to determine whether the PE is the DF for an I-Component Source Identifier (I-SID) associated with the BGP NLRI, and to add remote information from the BGP NLRI to the IS-IS database.

11. A computing device to execute a process to implement a provider edge switch (PE) for interworking an 802.1aq control plane with an Ethernet Virtual Private Network (EVPN) Border Gateway Protocol (BGP) control plane, the computing device comprising:

a processor configured to execute the PE, the PE including a control plane interworking function, an Intermediate System-Intermediate System (IS-IS) module and a BGP module, the control plane interworking function configured to determine whether a received IS-IS protocol data unit (PDU) requires a change in a configuration of a DF, to determine whether the PE is still the DF for one or more Backbone-Virtual Local Area Network Identifiers (B-VIDs), and to remove local DF associated network layer reachability information (NLRI) from a BGP database and remote NLRI from an IS-IS database, in response to the PE no longer being the DF.

12. The computing device of claim 11, wherein the control plane interworking function is further configured to synchronize the IS-IS database and BGP database with peer nodes, after removing the local DF associated NLRI from the BGP database and after removing information elements associated with a DF role obtained from remotely originated BGP NLRI from the IS-IS database.

13. The computing device of claim 12, wherein the control plane interworking function is further configured to determine whether the PE is the DF for any B-VID, to determine whether the IS-IS PDU contains new SPBM service identifier or unicast address sub-TLV change information, and to add the change information as NLRI to the BGP database from the IS-IS database.

14. The computing device of claim 11, wherein the control plane interworking function is further configured to add the DF associated network layer reachability information (NLRI) to the BGP database from the IS-IS database and local DF associated remote shortest path bridging media access control (MAC) mode (SPBM) sub tenants to the IS-IS database from the BGP database, in response to the PE becoming the DF for at least one B-VID.

15. The computing device of claim 11, wherein the BGP module is further configured to receive BGP NLRI from a peer node, and
wherein the control plane interworking function is further configured to determine whether the BGP NLRI contains new information, to determine whether the PE is the DF for an I-Component Source Identifier (I-SID) associated with the BGP NLRI, and to add remote information from the BGP NLRI to the IS-IS database.

* * * * *